(12) United States Patent
Wehr

(10) Patent No.: US 6,409,784 B1
(45) Date of Patent: Jun. 25, 2002

(54) FILTER WITH A PLANAR FILTER INSERT

(75) Inventor: Dieter Wehr, Stuttgart (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/658,262

(22) Filed: Sep. 8, 2000

(30) Foreign Application Priority Data

Sep. 10, 1999 (DE) .......................................... 199 43 467

(51) Int. Cl.$^7$ ............................................... B01D 35/30
(52) U.S. Cl. ........................ 55/385.3; 55/418; 55/497; 123/198 E
(58) Field of Search ............................... 55/385.3, 418, 55/497; 123/198 E

(56) References Cited

U.S. PATENT DOCUMENTS

| | | | |
|---|---|---|---|
| 4,713,097 A | * 12/1987 | Grawi et al. ................... | 55/497 |
| 4,826,517 A | * 5/1989 | Norman ......................... | 55/418 |
| 4,897,097 A | * 1/1990 | Yamamura ..................... | 55/419 |
| 5,564,513 A | * 10/1996 | Wible et al. ................ | 180/68.3 |
| 5,609,658 A | * 3/1997 | Takemura et al. ......... | 55/385.3 |
| 6,143,049 A | * 11/2000 | Gieseke et al. ............ | 55/385.3 |

FOREIGN PATENT DOCUMENTS

| | | |
|---|---|---|
| DE | 298 15 861 | 1/1999 |
| DE | 197 37 545 | 3/1999 |
| JP | 11-197429 | 7/1999 |

* cited by examiner

Primary Examiner—Robert A. Hopkins
(74) Attorney, Agent, or Firm—Crowell & Moring LLP

(57) ABSTRACT

A filter with a planar filter insert which includes a device for the deflection of the fluid entering for filtration. Filters of this kind are particularly useful as air filters for the intake air of an internal combustion engine. The device for deflection onto the filter insert 12 is preferably realized by the cross-sectional profile of the inlet chamber 21a. As the hatched plane 26 in FIG. 2 shows, the profile has a curved portion a which leads to a deflection of the flow from an inlet 23 toward the filter insert. In comparison with wedge-shaped inlet chambers, a low pressure region on the filter element near the inlet, which would lead to an unequal distribution of filtrate on the filter element, can be prevented. In this way an optimum useful life of the filter element can be achieved, which is beneficial to the economics of the filtering operation.

9 Claims, 2 Drawing Sheets

FILTER WITH A PLANAR FILTER INSERT

BACKGROUND OF THE INVENTION

The invention relates to a filter with a planar filter insert, especially an air filter for the air intake of an internal combustion engine, in which the filter comprises a housing with a cover into which the planar filter insert is installed so that it sealingly separates a raw air side of the filter from a clean air side, the raw side having at least one air inlet with a cross section aligned at least substantially perpendicular to the planar surface of the filter insert, and the clean side having an outlet for filtered air.

Filters of this type are disclosed, for example, in published German patent application no. DE 197 37 545 A1. This document discloses an air filter which has an air filter housing of substantially oblong shape. A flat filter insert is installed diagonally in this housing, so that a wedge-shaped inlet chamber starting from an inlet opening is provided for the filter insert. This inlet chamber on the raw-air side takes into account the circumstance that the volumetric flow on the raw-air side decreases along the filter insert, since parts of the volumetric flow are passing through it. Thus, the flow to the filter insert can be made uniform, with an optimum use of space.

However, studies of air filters with a wedge-shaped inlet chamber have shown that the described effect of making the flow uniform is but limited. This is because the flow starting from the inlet must first be deflected to the raw-air side surface so that it can flow through the filter medium. This deflection occurs not directly behind the inlet, so that the filter element at the end of the wedge-shaped inlet chamber is more strongly struck by the fluid being filtered than in the area adjoining the inlet. Due to this non-uniform inflow, aerodynamic conditions continue to occur which lead to the fact that the pressure difference between the raw-air side and the clean-air side of the filter element decreases greatly in certain areas. This can go so far that the pressure difference applied to the filter element is reversed, so that a flow from the clean side to the raw side occurs.

An example of the flow distribution in the wedge-shaped inlet chamber of a flat filter cartridge is to be seen in FIG. 2. The flow starting from the inlet is indicated by an arrow which leads into a region of great pressure difference between the raw and clean side of the filter at the end of the wedge-shaped inlet chamber. The deflection of the flow thus caused by the excess pressure prevailing therein leads to additional peak pressures on the filter element in the opposite corners. The regions of high pressure difference on the filter element are indicated by plus signs. This flow pattern can give rise to regions of low pressure in which a reversal of the pressure difference can occur.

The mass flow through the filter element of the fluid to be filtered is directly dependent on the applied pressure difference between the raw and the clean side. Therefore the unequal application of pressure to the filter element leads to a locally different separation of particles. The result is that the filter element is impacted irregularly by the filtrate, so that the element does not last as long as desired. The consequence is a shortening of the maintenance interval, which leads above all things to a loss of economy of operation.

SUMMARY OF THE INVENTION

The object of the invention, therefore, is to provide a filter with a flat filter insert, which will be impacted as uniformly as possible by the fluid being filtered.

This and other objects of the invention are achieved by the invention as described and claimed hereinafter.

The filter according to the invention comprises a filter housing into which a filter insert can be installed in a known manner. Thus, the raw air side of the filter starts from an inlet and the clean air side starts on the other side of the filter insert which leads to an outlet. Where the inlet opens into the housing, an inlet cross section is formed which is aligned at least substantially perpendicular to the planar surface of the filter insert. The inlet cross section can also be formed by a plurality of inlets.

The invention is characterized in that a device for the deflection of the fluid being filtered is provided. By means of this device, the fluid is deflected in the direction of the normals of the filter insert. The normals of the filter insert extend perpendicularly from the plane formed by the filter insert. By this is meant the plane which corresponds to the overall geometry of the filter insert. If the filter insert, for example, is formed from a pleated filter paper, the plane thus passes through the sum of the edges of the pleats in the filter paper.

The deflection is furthermore such that the fluid is guided against the raw air side of the filter surface in the area of the inlet. This is precisely the area in which, when known wedge-shaped inlet chambers are used, the region of low or even negative pressure difference forms. The formation of such a low pressure region can thus be prevented by the deflecting device. In this way the disadvantages described for the prior art filter insert are avoided. The filtrate can be distributed substantially uniformly over the entire filter surface. Thus the filter insert can achieve its optimum service life.

The device for the deflection of the air to be filtered operates especially effectively when the inlet cross section is oriented perpendicular to the planar surface of the filter insert. With this geometry the fluid in back of the inlet initially flows parallel to the filter insert, so that the disadvantages described develop. This phenomenon, however, also occurs when the alignment of the inlet cross section departs from the perpendicular to the filter insert. Even in such cases the deflection device can lead to a more uniform impingement against the filter element. Accordingly, the use of the invention is advantageous in all cases in which a more uniform impingement of the air stream on the filter can be achieved.

According to one specific embodiment of the invention, the deflecting device can consist of a curved tube or pipe nipple. This is attached directly to the inlet and causes the flow in the raw air side of the filter to be deflected onto the raw air side of the filter surface. This is advantageous above all in cases in which the filter construction is already completed and gives unsatisfactory results in regard to uniformity of the impact on the filter. The tube can be inserted as an add-on device into the existing filter housing. This additionally affords an acoustical improvement with respect to the noise level of the air intake noise.

Another variant of the invention envisions the deflecting device to be an integral component of the housing walls. In other words, the shape of the cover is adapted to the requirements of a uniform impingement on the filter insert. Thus optimum results can be achieved, which must be adapted to the individual case depending on the geometrical boundary conditions.

A cover profile that is especially favorable to the achievement of the effect according to the invention can be described, in which a plane perpendicular to the filter insert and to the inlet cross section is considered. This is selected especially such that it divides the inlet cross section precisely in two. In this plane the cover profile first has a curvature toward the filter insert which produces the desired deflection of the fluid toward the filter insert. Then the profile curves again away from the filter insert, which in comparison to a wedge-shaped inlet chamber has the result that the cross sections formed by the inlet chamber above, i.e., on the raw air side of the filter insert, diminish greatly toward the end of the filter housing. By the end of the filter housing is meant the end opposite from the inlet cross section. This is the end which is impacted by peak pressures in the case of a wedge-shaped inlet chamber. The constriction of the cross section decreases the volumetric flow in this area, with the effect that passage of air through the filter insert is also decreased. Of course, the profile described can be provided not only in the cover but also in other parts of the housing forming the raw air side of the filter.

The reduction of the cross section can be continuous across the entire filter insert. In this way the flow can be made even more uniform so that turbulence is avoided. In this manner too, a more uniform flow through the filter element can be achieved.

An additional measure towards smoothing the flow can be undertaken in configuring the inlet cross section. The latter should extend over the entire housing width, so that the smallest possible dead spaces for the flow are created in the corners of the inlet chamber. This prevents the so-called diffuser effect on the raw air side of the filter insert which can lead to turbulence in the inlet chamber. The more the intake cross section conforms to the end face of the inlet chamber, the less will be the turbulence in the inlet chamber. The end face of the inlet chamber is determined by the substantially perpendicular orientation of the inlet cross section relative to the filter insert.

If the inlet chamber at the raw air end is constructed symmetrically with respect to the previously mentioned surface (i.e. perpendicular to the filter insert and to the inlet cross section), an additional smoothing of the flow can be thereby achieved. A particularly advantageous embodiment results when the filter insert has a rectangular construction. Such filter inserts can be made at particularly low cost by using pleated paper sheets, which improves the economics of the invention.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawings ins which.

DETAILED DESCRIPTION OF PREFERRED EMBODIMENTS

Figure 1:
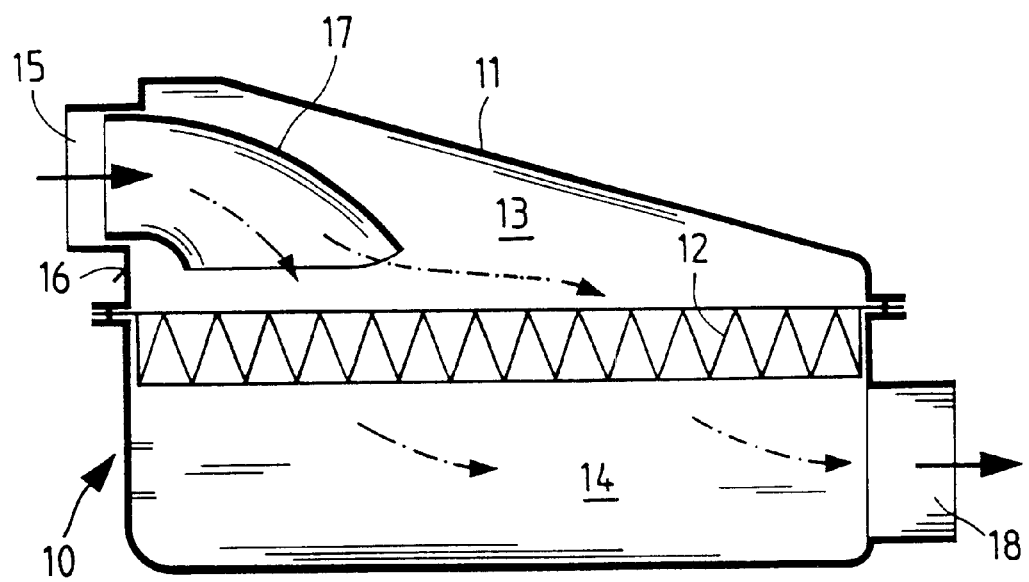
FIG. 1 is a schematic cross sectional view of the structure of a filter with a flat filter insert and wedge-shaped inlet chamber in which a curved pipe nipple is provided.

The filter in FIG. 1 comprises a housing 10 with a cover 11 into which a filter insert 12 is installed. Thus a raw air side 13 and a clean air side 14 are formed, with the raw air side tapering linearly from the inlet 15 in one end face 16 to the opposite side of the housing 10. A curved nipple or tube 17 is disposed in the inlet 15 with its curvature aimed toward the filter insert. The tube can be secured by adhesive, for example, in the inlet. The course of the air is indicated by arrows. It flows form the inlet 15 through the tube 17, through the filter insert 12 and leaves the housing through an outlet 18.

Figure 2:
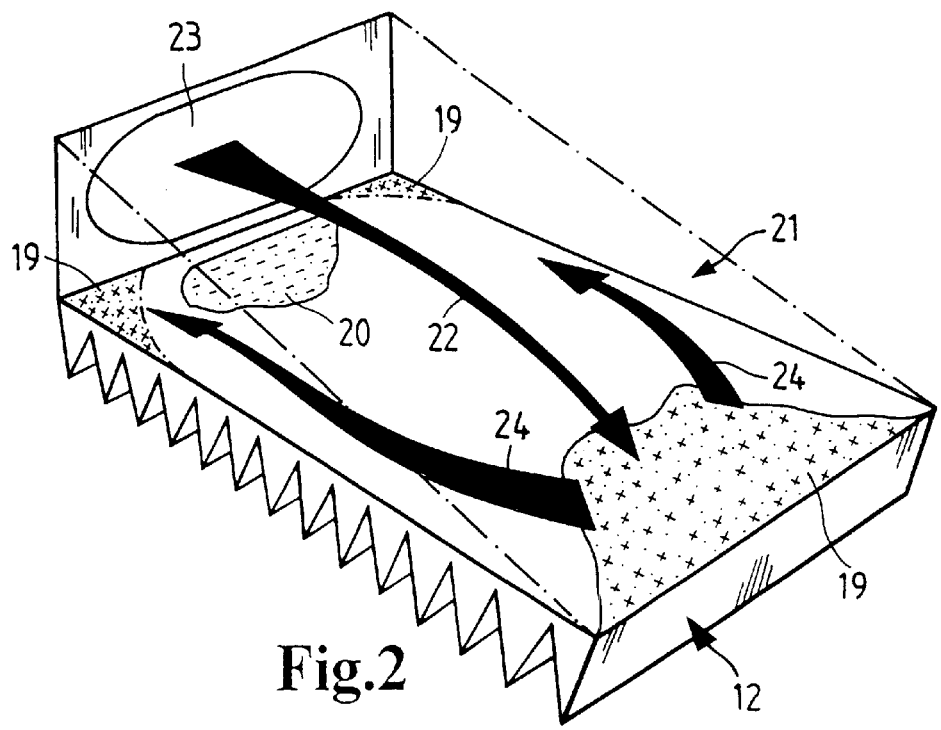
FIG. 2 is a perspective view of the distribution of the air flow in a wedge-shaped inlet chamber without a curved tube.

FIG. 2 shows the pressure distribution that is to be avoided on a filter insert 12 with a higher-pressure region 19 and a lower-pressure region 20 when a wedge-shaped inlet chamber 21 is used. A main stream 22 flows from an inlet cross section 23 to the opposite end of the inlet chamber and simultaneously produces oppositely directed eddy currents 24. The schematically represented air flow leads to the irregular pressure distribution above the filter insert 12.

Figure 3:
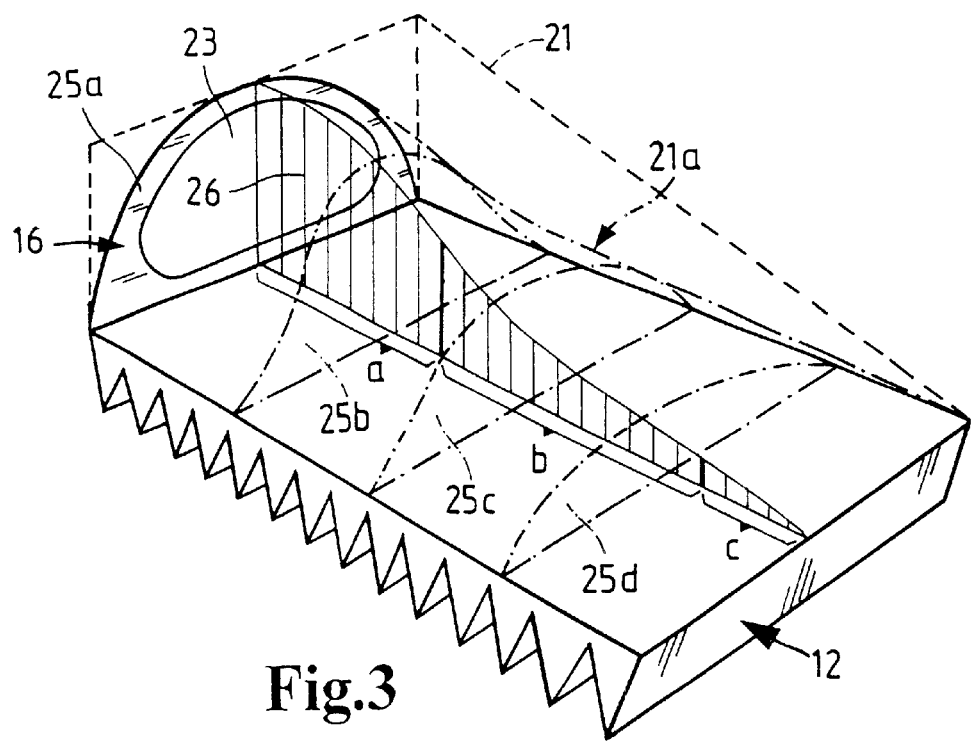
FIG. 3 is a perspective view of the geometry of an inlet chamber in which the device for deflecting the entering fluid is realized by the cross-sectional shape of the inlet chamber.

An alternative configuration of the inlet chamber 21a to the filter insert 12 of FIG. 2 is shown in FIG. 3. The wedge-shaped inlet chamber 21 is represented in broken lines for comparison. The inlet cross section 23 occupies the greatest part of the end surface 16. The end surface 16 simultaneously forms an inlet-end cross section 25a of the inlet chamber 21a. The further course of the cross section in the direction of the main stream is indicated by the cross sections 25b to d. It is apparent that a steady reduction of the cross section is achieved in the inlet chamber.

Consideration of the hatched plane 26 provides further information on the profile of the inlet chamber 21a. From this it is clear that this profile has a curve a toward the filter element, which is adjoined by a curve b away from the filter element. Curve b transitions into a curve c which is directed toward the filter element and terminates at the level of the raw side surface of the filter insert. The curve a is responsible for the fact that a deflection of the main flow (Cf. FIG. 2) toward the filter element occurs, so that any low pressure region 20 (Cf. FIG. 2) is avoided.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A filter comprising a filter housing, a housing cover, and a planar filter insert sealingly installed in said housing such that the filter insert divides the housing into an inlet chamber for fluid to be filtered from an outlet chamber for filtered fluid; at least one inlet for admitting fluid to be filtered into said inlet chamber, and an outlet for discharging filtered fluid from said outlet chamber; said at least one inlet having an inlet opening cross section aligned substantially perpendicular to the plane of said filter insert, wherein said filter is equipped adjacent said at least one inlet with a deflector for deflecting fluid to be filtered entering said inlet chamber in a direction perpendicular to the planar surface of the filter insert and toward the planar surface of said filter insert adjacent said at least one inlet, and wherein said deflector comprises a curved tube which receives fluid from said at least one inlet and discharges the fluid toward the planar filter insert.

2. A filter according to claim 1, wherein said filter is an air filter for the intake air of an internal combustion engine.

3. A filter comprising a filter housing, a housing cover, and a planar filter insert sealingly installed in said housing such that the filter insert divides the housing into an inlet chamber for fluid to be filtered from an outlet chamber for filtered fluid; at least one inlet for admitting fluid to be filtered into said inlet chamber, and an outlet for discharging filtered fluid from said outlet chamber; said at least one inlet having an inlet opening cross section aligned substantially perpendicular to the plane of said filter insert, wherein said filter is equipped adjacent said at least one inlet with a deflector for deflecting fluid to be filtered entering said inlet chamber in a direction perpendicular to the planar surface of the filter insert and toward the planar surface of said filter insert adjacent said at least one inlet, and wherein said deflector comprises a portion of the housing wall formed by said cover.

4. A filter according to claim 3, wherein said cover has a profile which, measured in a plane perpendicular to the filter insert and to the inlet cross section, describes a curve a adjacent said at least one inlet which curves toward the filter insert, and adjoining said curve a a further curve b which curves away from the filter insert.

5. A filter according to claim 4, wherein said cover has a profile with a cross section above the filter insert, measured parallel to the inlet opening cross section, which converges continuously from the at least one inlet toward the opposite side of the housing.

6. A filter according to claim 1, wherein the inlet opening cross section is as wide as said housing.

7. A filter according to claim 6, wherein the inlet opening cross section extends over an entire end face of said housing.

8. A filter according to claim 1, wherein said cover is configured symmetrically with respect to a plane perpendicular to the plane of said filter insert and to said inlet opening cross section.

9. A filter according to claim 1, wherein the filter insert is rectangular.

\* \* \* \* \*